US010437608B2

(12) United States Patent
Sarukhanov et al.

(10) Patent No.: US 10,437,608 B2
(45) Date of Patent: Oct. 8, 2019

(54) MICROMINIATURE PERSONAL COMPUTER AND METHOD OF USING THEREOF

(71) Applicants: Wagan Sarukhanov, Moscow (RU); Igor Komov, Moscow (RU); Alexander Podelko, Stamford, CT (US)

(72) Inventors: Wagan Sarukhanov, Moscow (RU); Igor Komov, Moscow (RU); Alexander Podelko, Stamford, CT (US)

( * ) Notice: Subject to any disclaimer, the term of this patent is extended or adjusted under 35 U.S.C. 154(b) by 470 days.

(21) Appl. No.: 15/071,164

(22) Filed: Mar. 15, 2016

(65) Prior Publication Data

US 2016/0196154 A1    Jul. 7, 2016

Related U.S. Application Data

(63) Continuation-in-part of application No. 14/271,857, filed on May 7, 2014, now abandoned, which is a
(Continued)

(30) Foreign Application Priority Data

Aug. 24, 2009   (RU) ................................ 2009131804

(51) Int. Cl.
*G06F 1/26*        (2006.01)
*G06F 9/445*       (2018.01)
(Continued)

(52) U.S. Cl.
CPC .......... *G06F 9/44505* (2013.01); *G06F 1/266* (2013.01); *G06F 12/1466* (2013.01); *G06F 13/102* (2013.01); *G06F 13/4282* (2013.01); *H04W 4/80* (2018.02); *G06F 2212/1052* (2013.01)

(58) Field of Classification Search
None
See application file for complete search history.

(56) References Cited

U.S. PATENT DOCUMENTS 5,132,729 A    7/1992   Matsushita et al.
5,264,992 A    11/1993  Hogdahl
(Continued)

OTHER PUBLICATIONS

Comparison of portable platforms, Wikipedia, Nov. 2, 2009, http://en.wikipedia.org/wiki/Comparison_of_portable_platforms.
(Continued)

*Primary Examiner* — Paul Yen
(74) *Attorney, Agent, or Firm* — Whitmyer IP Group LLC

(57) ABSTRACT

A microminiature personal computer that is connected to external devices using standard interfaces for information input and output. The microminiature personal computer has an interconnected processor, a memory, a security module, a network module, and connectors. At least part of memory should be non-volatile to keep operating system, drivers to work with external devices, programs and data. The microminiature personal computer does all its processing and all its programs are running inside its memory while external computing device is used only for information input and output through a connector and a windowing system thus ensuring security of both systems and lack of unauthorized interaction between them.

16 Claims, 5 Drawing Sheets

Related U.S. Application Data continuation-in-part of application No. 12/624,724, filed on Nov. 24, 2009, now abandoned.

(51) Int. Cl.
  *G06F 13/10* (2006.01)
  *G06F 12/14* (2006.01)
  *G06F 13/42* (2006.01)
  *H04W 4/80* (2018.01)

(56) References Cited

U.S. PATENT DOCUMENTS

| | | | |
|---|---|---|---|
| 5,822,230 A | 10/1998 | Kikinis | |
| 6,029,183 A | 12/2000 | Jenkins | |
| 6,373,500 B1 | 4/2002 | Daniels | |
| 6,513,719 B1* | 2/2003 | Imura | G06F 21/79 235/436 |
| 6,538,880 B1 | 3/2003 | Kamijo | |
| 6,651,171 B1* | 11/2003 | England | G06F 12/1491 711/163 |
| 7,134,015 B2 | 11/2006 | Kulack et al. | |
| 7,533,408 B1* | 5/2009 | Arnouse | G06F 1/16 380/59 |
| RE41,092 E | 1/2010 | Chu | |
| 7,725,614 B2 | 5/2010 | Jogand-Coulomb | |
| 8,024,790 B2 | 9/2011 | Zhao | |
| 8,666,394 B1* | 3/2014 | Montemurro | H04W 76/14 455/426.1 |
| 8,699,218 B2* | 4/2014 | Xu | G06F 1/1633 361/679.31 |
| 2002/0095389 A1 | 7/2002 | Gaines | |
| 2002/0097554 A1 | 7/2002 | Smith | |
| 2002/0097555 A1 | 7/2002 | Smith | |
| 2003/0084332 A1 | 5/2003 | Krasinski | |
| 2003/0212862 A1 | 11/2003 | James | |
| 2005/0187668 A1 | 8/2005 | Baumgarte | |
| 2005/0278774 A1 | 12/2005 | Eshleman | |
| 2006/0059345 A1* | 3/2006 | Fayad | G06F 21/72 713/173 |
| 2006/0253894 A1 | 11/2006 | Bookman | |
| 2007/0087725 A1 | 4/2007 | Anderson | |
| 2007/0214187 A1 | 9/2007 | Thomas | |
| 2008/0048975 A1 | 2/2008 | Leibow | |
| 2008/0052770 A1 | 2/2008 | Ali | |
| 2008/0126705 A1 | 5/2008 | Jogand-COulomb | |
| 2008/0256536 A1 | 10/2008 | Zhao | |
| 2008/0307409 A1 | 12/2008 | Lu | |
| 2009/0126009 A1 | 5/2009 | Arnouse | |
| 2009/0200367 A1 | 8/2009 | Arnouse | |
| 2009/0319782 A1 | 12/2009 | Lee | |
| 2010/0011375 A1* | 1/2010 | Kivinen | G06F 21/53 719/313 |
| 2012/0243158 A1* | 9/2012 | Gentil | G09G 5/006 361/679.03 |
| 2015/0215570 A1 | 7/2015 | Leibow | |

OTHER PUBLICATIONS

U3, Wikipedia, Nov. 14, 2009, http://en.wikipedia.org/wiki/U3.
Startkey, Wikipedia, http://en.wikipedia.org/wiki/Startkey.
Computer form factor, Wikipedia, Nov. 30, 2009, http://en.wikipedia.org/wiki/Computer_form_factor.
What are U3 Smart Drives and What Programs Can I Use on Them, PC Hell, http://www.pchell.com/support/u3smartdrives.shtml.
Latest of USB Apps & Platforms, USB Apps & Platform Newbie Guide & News, Everything USB, 2009, http://www.everythingusb.com/software.html.
MojoPac Guide, MojoPac Mobile Gaming Platform & More, Everything USB, 2009, http://www.everythingusb.com/mojopac.html.
MojoPac, Wikipedia, Nov. 16, 2009, http://en.wikipedia.org/wiki/Mojopac.
VMware ThinApp, Wikipedia, Nov. 21, 2009, http://en.wikipedia.org/wiki/Vmware_thinapp.

* cited by examiner

MICROMINIATURE PERSONAL COMPUTER AND METHOD OF USING THEREOF

REFERENCE TO COPENDING PATENT APPLICATIONS

This is a continuation-in-part of U.S. application Ser. No. 14/271,857 filed May 7, 2014, now abandoned, which is in turn a continuation-in-part of U.S. application Ser. No. 12/624,724 filed Nov. 24, 2009, now abandoned, which is accorded the benefit of foreign priority from Russian Federation patent document no. 2009131804 filed Aug. 24, 2009.

BACKGROUND OF THE INVENTION

The present invention relates to a microminiature personal computer, i.e., a small form factor general-purpose computer using external devices for information input and output.

In computing, a form factor specifies the physical dimensions of major system components. There were numerous efforts to create small form-factor devices which would be really small and portable and provide functionality of general-purpose computer. It is possible to classify these efforts into several categories.

The largest category is small computers with built-in devices for user information input and output, sometimes referred to as mobile computing. There are many groups of such devices and they are marketed under different names, including pocket personal computer (PC), personal digital assistant (PDA), tablet PC, handheld PC, micro PC, smart phone, ultra-mobile PC.

Including user interface doesn't allow to decrease the size of these devices beyond certain limits due to requirements imposed by human—computer interaction (to be usable, screen and keyboard can't be too small). Small input/output devices often require special software and limit functionality.

Another category are portable computers without user interface, but requiring special hosting devices to be attached to. While there are many inventions claimed (20060253894, U.S. Pat. No. 6,538,880, 20020097555, U.S. Pat. Nos. 7,533,408, 5,264,992, 5,708,840, 6,029,183, 20090200367), devices embodied such inventions are expected to use special hosting devices.

The third group, sometimes referred to as software mobility or portable platforms, is a technology of storing software and data in a mobile storage medium. When the device is attached to a host computer, these programs may be loaded into the host computer and executed there.

All processing is done by the host computer in this case, so it limits what programs can be run. Security risk is higher because the host computer and the storage device are not isolated and computer protection may be discredited by malicious software located on removable media.

The fourth group is portable computers without user interface created to expand the function of the external devices (such as U.S. Pat. No. 8,699,218 B2). Designed to expand functions of the external devices they allow different ways of interaction between the external device and the portable computer thus introducing security risks.

It would be desirable to implement in a small form factor (for example, such as a USB flash drive) a microminiature personal computer without a screen, keyboard, touch screen and other user input-output devices, but able do all processing so programs run inside the microminiature personal computer and able to connect to an external computing or display devices for information input and output. The external device, to which the microminiature personal computer is connected, is used only for information input and output through an encrypted network connection between them. Thus security of both systems is assured due to the lack of unauthorized interaction between the microminiature personal computer and the external device.

SUMMARY OF THE INVENTION

One aspect of the invention relates to a microminiature personal computer, which interconnects a processor, a memory, a security module, a network module, and a connector in a small form factor (for example, such as a USB flash drive). The microminiature personal computer doesn't have any traditional computer user interface (such as a keyboard, mouse, or monitor) and uses external devices for information input and output.

The microminiature personal computer has non-volatile memory to keep an operating system, programs, and data. The operating system and programs of the microminiature personal computer are executed in its memory, while the external device is used only for information input and output through an encrypted network connection. External devices doesn't have access to the memory of microminiature personal computer except a special isolated area with programs and drivers needed to establish a secure connection between the external device and the microminiature personal computer, thus ensuring security of both systems and lack of unauthorized interaction between them.

The processor speed and memory volume of the microminiature personal computer are sufficient for running office, business and game program under supervision of its Operating System (for example, a flavor of UNIX), access to Local Area Network and Internet, playing audio- and video-information.

Another aspect of the invention relates to a method, assembling a microminiature personal computer into an operative condition by connecting it to an external device. The external device gets connected through an encrypted network connection (using, for example, SSH) and a windowing system (such as the X Window System/X11). If the external device doesn't have all necessary programs to establish the connection, it installs them from a special isolated area of the microminiature personal computer memory with programs and drivers needed to establish a secure connection between the external device and the microminiature personal computer (the only area of the microminiature personal computer memory that is available to external devices).

After the connection is established, the microminiature personal computer does all processing having an operating system, drivers and applications inside his memory. The external computing device (e.g. a PC), as it relates to the microminiature personal computer, being used only for information input and output through the encrypted network connection between the microminiature personal computer and the windowing system of external computing device.

A further aspect of the invention resides in a method of use, involving running an operating system and programs by a microminiature personal computer while user interacts with them providing input and receiving output using an external device connected to the microminiature personal computer through the encrypted network connection (using, for example, SSH).

All communication between the microminiature personal computer and the external device happens only through the encrypted network connection and a windowing system (such as the X Window System/X11), so neither of them has direct access to each other memory or devices.

User provides input using interfaces of the external device (such as a keyboard, mouse, or monitor) to communicate with the programs running on microminiature personal computer and the output of the programs running by the microminiature personal computer is sent to the interfaces of the external device (such as a monitor, speaker, or network connected device), providing a two-way communication exclusively through the encrypted network connection and the windowing system. The windowing system (such as the X Window System/X11) handles all communication between the external computing device and the microminiature personal computer and work with windows on the external computing device.

The external device used for input and output remains fully functional and may execute its own program using its own resources (processors, memory, etc). Users may work simultaneously with programs run by the external device and programs run by the microminiature personal computer represented, for example, by different windows on the monitor of the external device (with the windowing system handling communication with the microminiature personal computer for the windows representing programs executed by the microminiature personal computer).

Desktop or portable computers can be used as external computing devices, as well as external displaying devices (such as monitors or TV sets), smart phones, personal digital assistants, and multimedia devices. Different interfaces can be used to connect to external input/output devices; for example, USB, HDMI, IEEE 1394, LPT, Ethernet, Wi-Fi, and Bluetooth. USB is a universal serial bus for connection, communication, and power supply between computers and electronic devices. The USB specifications provide a 5 V supply on a single wire to power connected USB devices. HDMI is a high definition multimedia interface that serves as a compact audio/video interface for transferring uncompressed video data and compressed or uncompressed digital audio data from a HDMI-compliant source device to a compatible computer monitor, video projector, digital television, or digital audio device. IEEE 1394 is a serial bus interface standard for high-speed communications and isochronous real-time data transfer. LPT is a line print terminal for a parallel port connection to a printer or other device on a personal computer. Ethernet is a family of networking technologies for local area networks. Wi-Fi is a technology that allows an electronic device to exchange data or connect to the internet wirelessly using radio waves. Bluetooth is a wireless technology standard for exchanging data over short distances from fixed and mobile devices, and building personal area networks (PANs).

While there were significant advancements in areas of miniature computing and there are many products and inventions that share some features with the microminiature personal computer, the microminiature personal computer differs from all of them in one or several important ways.

One category is mobile computing devices, known under different names, such as pocket personal computer (PC), personal digital assistant (PDA), tablet PC, handheld PC, micro PC, smart phone, ultra-mobile PC. They differ from the microminiature personal computer by having built-in devices for user information input and output. While it allows to use them completely autonomously, small devices for user information input and output are not convenient to use and limit how small the whole device could be. They usually have limited means of collaboration with external devices and often require special software. The microminiature personal computer doesn't have devices for input/output and use generic software.

Another category is portable computers without user interface, but requiring special hosting devices to be attached to. While there are many inventions claimed (20060253894, U.S. Pat. No. 6,538,880, 20020097555, U.S. Pat. Nos. 7,533,408, 5,264,992, 5,708,840, 6,029,183, 20090200367), they are expected to use special hosting devices. The microminiature personal computer works with generic external devices and doesn't need any modification of them.

The third large group, sometimes referred to as software mobility or portable platforms, is a technology of storing software and data in a mobile storage medium. When the device is attached to a host computer, these programs may be loaded into the host computer and executed there. All processing is done by the host computer in this case, so it limits what programs can be run. Security risk is higher because the host computer and the storage device are not isolated and computer protection may be discredited by malicious software located on removable media. The microminiature personal computer does all processing itself and communicate with the external device only through the encrypted network connection and the windowing system.

The fourth group is portable computers without user interface created to expand the function of the external devices (such as U.S. Pat. No. 8,699,218 B2). Designed to expand functions of the external devices they don't limit communication between the external device and the portable computer as this invention does using security module, network module, limited access to memory, and the described method of communication thus ensuring the level of security needed to keep programs and data safe.

BRIEF DESCRIPTION OF THE DRAWINGS

For a better understanding of the present invention, reference is made to the following description and accompanying drawings, while the scope of the invention is set forth in the appended claims.

DETAILED DESCRIPTION

The herein described an apparatus and method offer a new type of computing device that provides simultaneously a miniature design, the protection of personal information and security connections with remote servers or desktops. Current computer systems, such as desktops, laptops, tablets and smartphones are devices that capable of performing the tasks of the user both in stationary and mobile states. By reducing the size of the computing devices the quality is deteriorating such as clarity of text and images on the screen, ease of information input and parallel computing in multiple windows. For example, the power of the smartphone is sufficient to perform office tasks, but on the touch screen is very inconvenient to work with multiple editor windows, or to allocate part of the text to be formatted.

Current computer systems have one important disadvantage: unprotected user data against unauthorized access by hackers and malicious software. People are forced to buy and install antivirus software, keep track of the latest virus database, to pay extra for monthly/annual update. One should not be forgotten if the virus got into the computer system before the installation of anti-virus software, then in most cases the system cannot be cured. Furthermore, when you try to connect to the remote desktop or provide remote access to personal/corporate servers, there is a risk that such a connection will be intercepted by an attacker to get access to your data, or worse, to your remote servers and desktops.

Figure 1A:
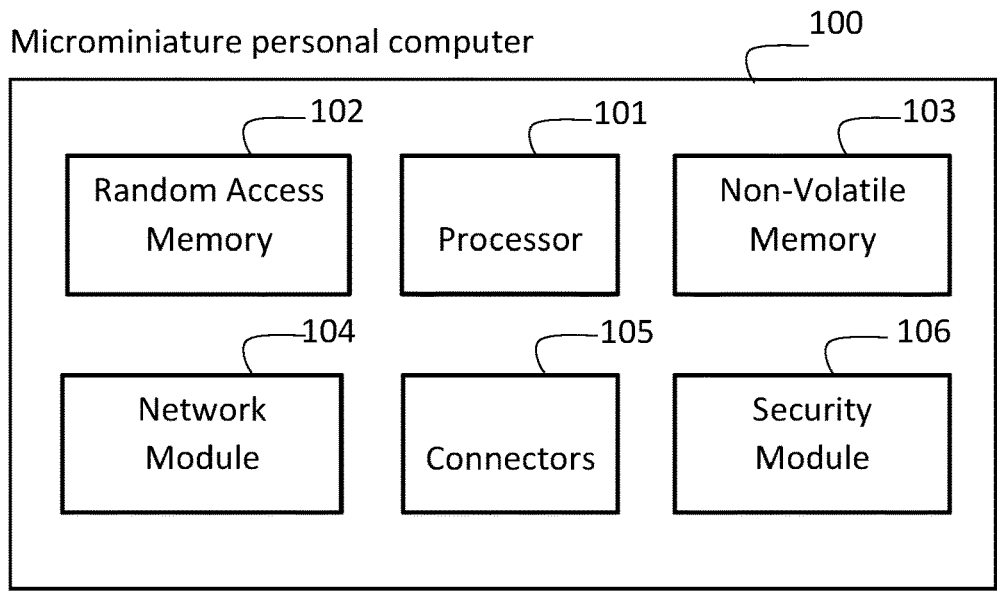
FIG. 1A-1C is a block diagram of the microminiature personal computer.

The herein described apparatus and method aim to overcome the shortcomings of current computer systems. In an illustrative implementation shown on FIG. 1A, a microminiature personal computer 100, which could be implemented in USB-flash form factor, comprises an interconnected processor 101, a random access memory 102 (RAM), a non-volatile memory 103, a security module 106, a network module 104, and connectors 105. The microminiature personal computer 100 can be attached by connectors 105 to an external device, which works as an external input/output device.

Figure 1B:
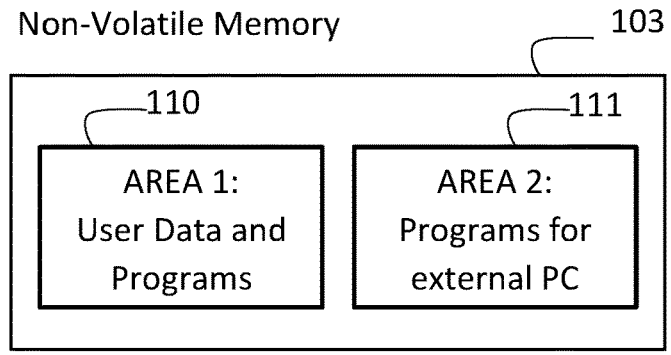

According to the diagram shown on FIG. 1B, the non-volatile memory 103 of the microminiature personal computer consists of at least two areas. One area 110 is for the operating system, data and programs. The second area 111 is used for storing programs and drivers needed for external devices (such as X Window System Server emulator in case of connection to an external computer based on Windows). This area has the ability to be logically attached to an external computing device as a removable storage drive and is the only area accessible by the external device.

Figure 1C:
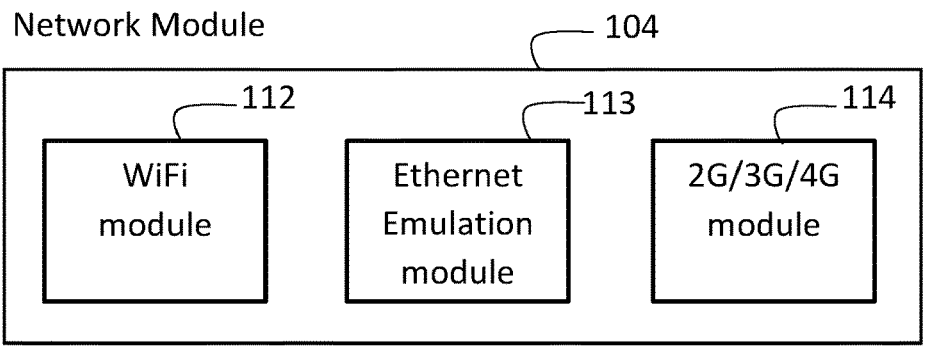

According to the diagram shown on FIG. 1C, the network module 104 of the microminiature personal computer consist of Wi-Fi module 112, Ethernet emulation module 113, and 2G/3G/4G module 114. The modules can be operated simultaneously to implement a gateway between the Wi-Fi module and 2G/3G/4G module, or between the Ethernet emulation module and 2G/3G/4G module.

Figure 2:
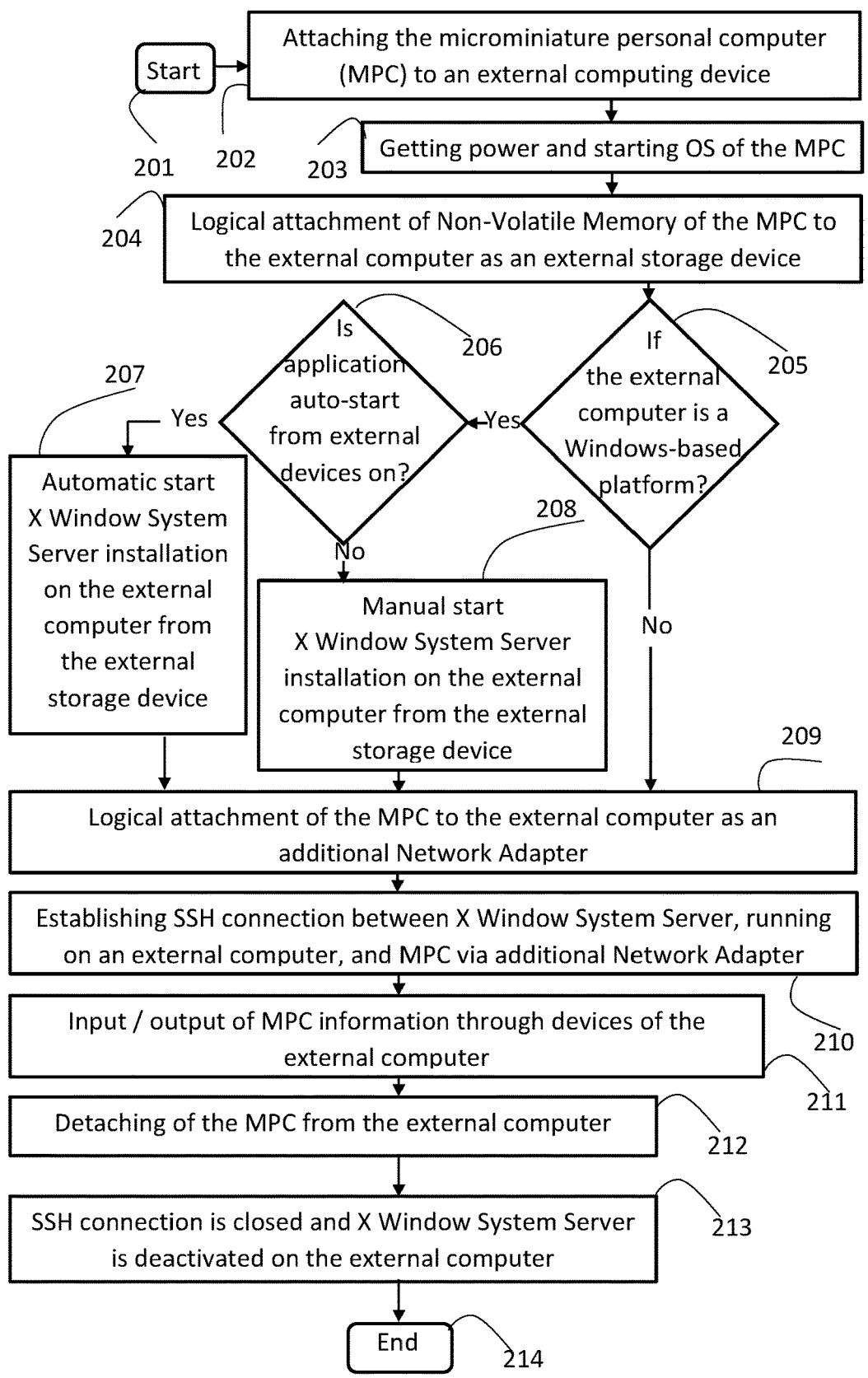
FIG. 2 is a flowchart of the connection of microminiature personal computer to the external computer.

According to the flowchart shown on FIG. 2, the microminiature personal computer 301 is working as following:

Step 201: Start

Step 202: Attaching the microminiature personal computer 301 to the external computer 410 by USB connector 303

Step 203: Getting power through the USB connection and starting the operating system of the microminiature personal computer 301

Step 204: Running the first service in the RAM 102 to make logical attachment of second area 111 of non-volatile memory 103 to the external computer as an external storage device Step 205: Running the second service in the RAM 102 to determine the type of operating system of the external computer. If external computer is a non-Windows-based computer, then go to step 209

Step 206: If the setting of external computer is not allowing to auto-start applications from external devices, then go to step 208

Step 207: Automatic running the emulator X Window System Server in the memory of the external computer, then go to step 209

Step 208: Manual running the emulator X Window System Server in the memory of the external computer Step 209: Running the third service in the RAM 102 to represent a network module 104 to an external computer, as an additional network adapter by using the Ethernet Emulation module 113

Step 210: Running the fourth service in the RAM 102 to establish a secure data transfer protocol (e.g. SSH) for the connection to the windowing system (e.g. X Window System Server), launched in memory of the external computer, which opens at least one window to provide input-output for the programs running in the RAM 102 of the microminiature personal computer.

Step 211: A secure protocol is used for communication between the microminiature personal computer 301 and the X Window System Server. Programs running in the RAM 102, can create input-output windows for displaying information inside X Window System of an external computer. For the user it looks like he continues to work with the external computing device as usual, but sees the microminiature personal computer as another computer connected to the network and sees its remote desktop. Work with the microminiature personal computer is conducted by input and output of information from the microminiature personal computer 301 through the created input-output windows by user interface devices of the external computing device 410 while the programs are executed inside the microminiature personal computer 301.

The user may use keyboard, mouse, and other user interface devices of the external computing device 410 to work with programs inside the microminiature personal computer 301 when the focus is inside the input-output window. The created input-output windows is the only way of communication between the external computing device 410 and the microminiature personal computer 301.

Step 212: Detaching the microminiature personal computer 301 from the external computer 410 when work is done.

Step 213: Then connection with secure data transfer protocol (e.g. SSH) is closed and X Window System Server is deactivated on the external computer 410.

Step 214: End

Figure 3:
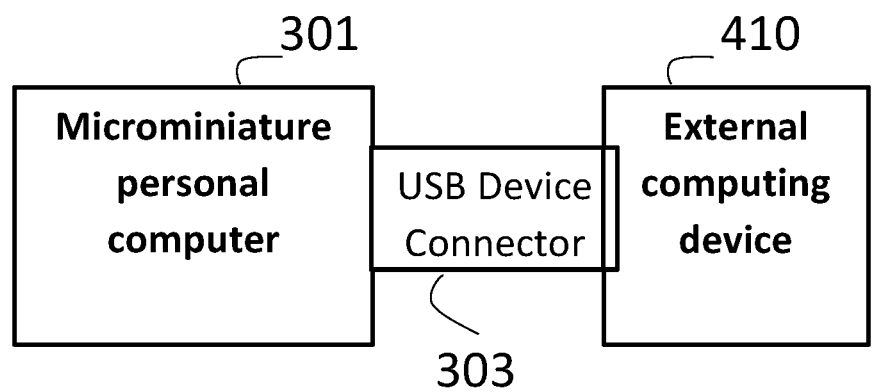
FIG. 3 is a block diagrams showing a microminiature personal computer connected to an external computing device.

FIG. 3 is a block diagram showing the microminiature personal computer 301 connected to an external computing device 410 by the USB Device connector 303.

Figure 4:
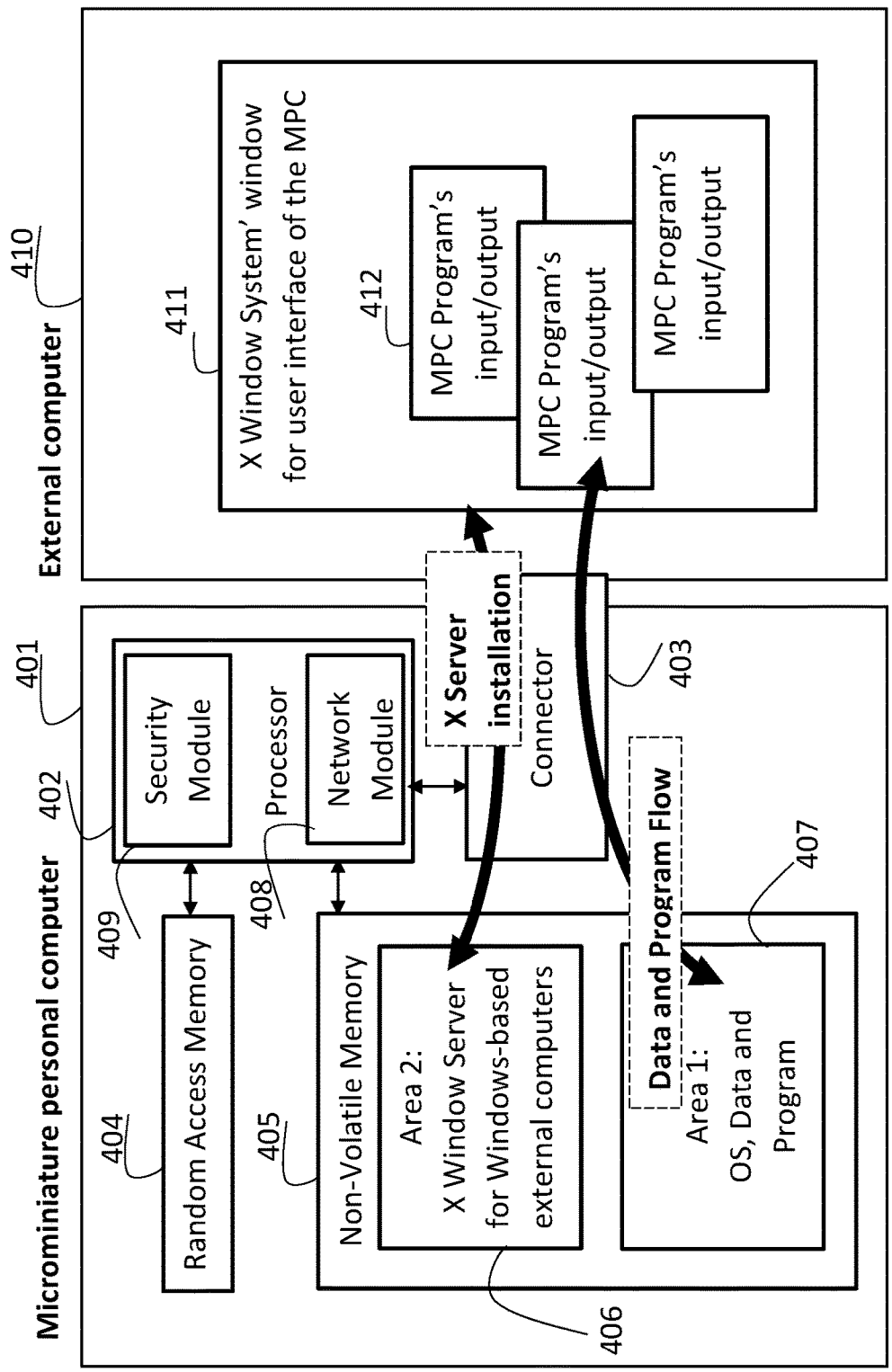
FIG. 4 is a diagram showing an illustrative interaction of a microminiature personal computer and an external computing device.

FIG. 4 shows an example of the microminiature personal computer 401 connected to the external computer 410. The microminiature personal computer 401 comprises a processor 402, USB Device connector 403, RAM 404, non-volatile memory 405, network adapter 408 and security module 409. Non-volatile memory 405 is divided into two parts: Area #1 407 is used to store the Operating System (for example, a flavor of UNIX), services, drivers and user programs, Area #2 406 is used to store X Window System/X11 emulator, when connected to an external computer with Windows operating system.

After connecting to an external computer 410 via the USB Device connector 403 micro miniature personal computer 401 is powered, then the processor 402 reads Operating System's instructions from the non-volatile memory Area #1 407 and executes them in the RAM 404. After starting the Operating System Kernel is performed a serial launch services that determine the further course of the interaction between micro-miniature personal computer 401 and an external computer 410.

Service #1 determines the type of Operating System of an external computer 410. If the external computer 410 is running the Windows operating system, then the Service #2 connects the Area #2 of non-volatile memory 406 that stores the installation program of the X Window System emulator (for example, XMing) to the external computer 410 as a removable disk media. If the security settings of the external computer 410 allow to automatically launch programs from removable media, then the installation of the X Window System Server emulator is automatically started. Otherwise, the user must run the setup program manually. After starting X Window System Server emulator, for example, XMing, in the RAM of the external computer, means remote display appears in the external computer.

If the external computer 410 is a Unix-like system, then it already includes X Window System Server, and launch additional installation is not required.

Service #3 connects the network module 408 to an external computer 410, as an additional network card with a predetermined address. On Windows computers, such a connection is made with the help of the driver, for example, RNDIS (Remote Network Driver Interface Specification), which provides a virtual Ethernet connection. On computers with a Unix-like operating systems such a connection is made via the module kernel, for example, usbnet. As a result, between micro-miniature personal computer 401 and the external computer 410 the Ethernet connection is established.

Service #4 via security module 409 establishes a connection between the microminiature personal computer 401 and X Window System Server 411 based on a secure transmission protocol, for example SSH. As a result of such a connection the programs running in the RAM of the micro miniature personal computer 401 can create the input/output windows 412 on the screen of the external computer via protocol commands of X Window System, and display information in them and receive data with its keyboard and mouse.

After completion of the operation, the user disconnects micro-miniature personal computer 401 from an external computer 410, resulting in a microminiature personal computer is turned off, closing the secured connection between microminiature personal computer 401 and an external computer 410, where any previously open windows 412 are closed.

Based on these steps, a method may be realized in accordance with a preferred embodiment: of communication between a microminiature personal computer and an external computing device. The method includes the steps of:

attaching the microminiature personal computer to an external computer device using a USB connector;

getting power through the USB connection and starting the operating system of the microminiature personal computer;

getting a windowing system (such as the X Window System/X11) used for information input and output running on the external device. If needed, install necessary drivers and programs from a special area of non-volatile memory available to the external device;

establish a secure data transfer protocol (such as SSH) for the connection to the external device;

do work as user programs running inside the micromin-iature personal computer and user communicating with them through input-output windows of the windowing system of the external computer;

the external computing device remains working, may do its own unrelated processing, control the screen except the windows with information of the microminiature personal computer supported by the windowing system;

when work is done, detaching the microminiature personal computer from the external computer. Then the secure connection is closed and the windowing system is deactivated on the external computing device.

The method above is the main way of using the microminiature personal computer. Other exemplary methods of using of the microminiature personal computer according to the present invention are introduced below. In many such configuration it is necessary to use a USB charger to power the microminiature personal computer through the USB Device connector.

One such usage would be connecting the microminiature personal computer to a monitor or TV set with a HDMI connector.

Figure 5A:
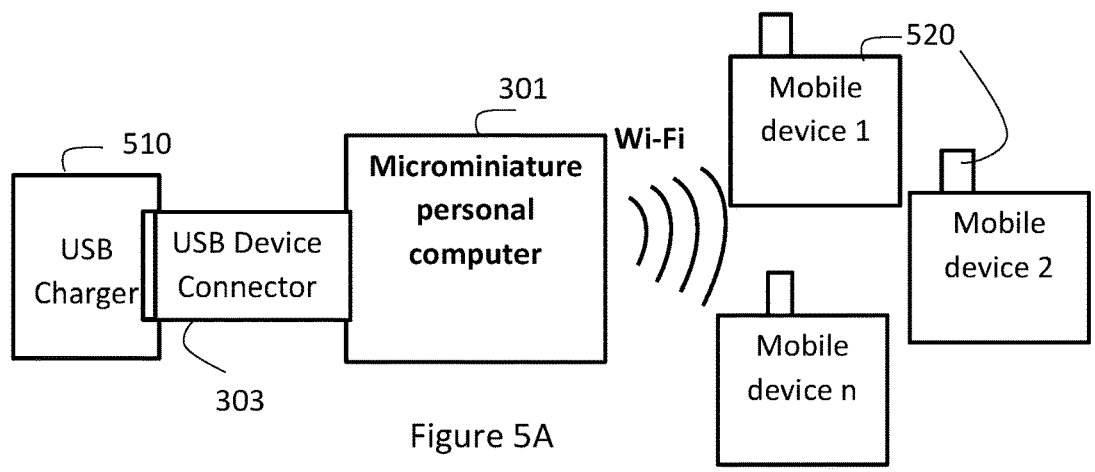
FIG. 5A-5D are block diagrams showing an illustrative interaction between a microminiature personal computer and different external devices.

FIG. 5A shows an illustrative interaction of the microminiature personal computer 301 as an Access Point device. The microminiature personal computer 301 is connected through the USB Device connector 303 to a USB charger 510. After the microminiature personal computer 301 get power from the USB charger 510, it starts the Operating System. A service of the Operating System determines that configuration and starts the network module 308 as a Wi-Fi access point. In that mode external mobile devices 520 can connect to the microminiature personal computer 301 to use its network module as a bridge to connect to the Internet. That allow users of external mobile devices 520 to avoid connection to an unsecured public access point.

Figure 5B:
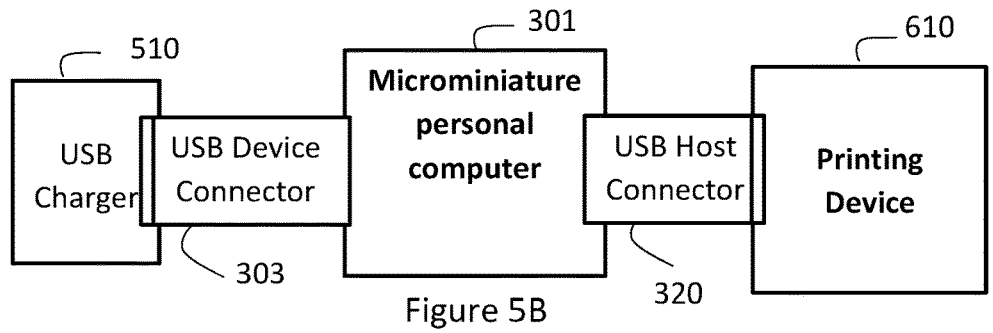

FIG. 5B shows an illustrative interaction between the microminiature personal computer 301 and a printing device 610 via a USB Host connector 320. After the microminiature personal computer 301 get power from the USB charger 510 via a USB Device connector 303, it starts the Operating System. A service of the Operating System recognizes the printing device 610 and starts to print pre-set data from non-volatile memory until all pre-set data would be printed or the device would be disconnected.

Figure 5C:
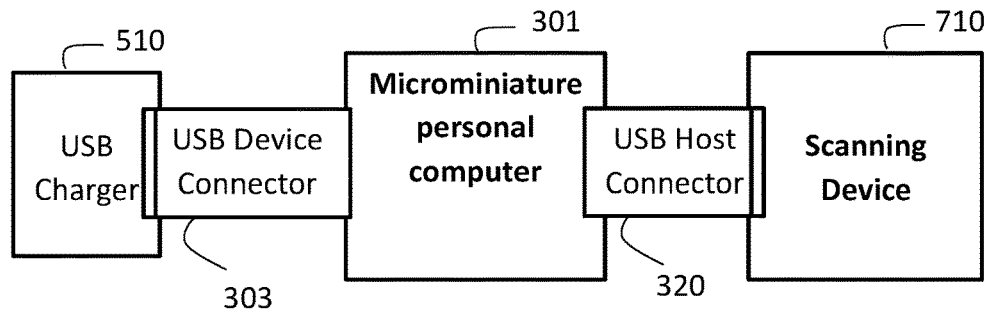

FIG. 5C shows an illustrative interaction between the microminiature personal computer 301 and a scanning device 710 via a USB Host connector 320. After the microminiature personal computer 301 get power from the USB charger 510 via a USB Device connector 303, it starts the Operating System. A service of the Operating System recognizes the scanning device 710 and starts to save into non-volatile memory all scanned documents until the device would be disconnected.

Figure 5D:
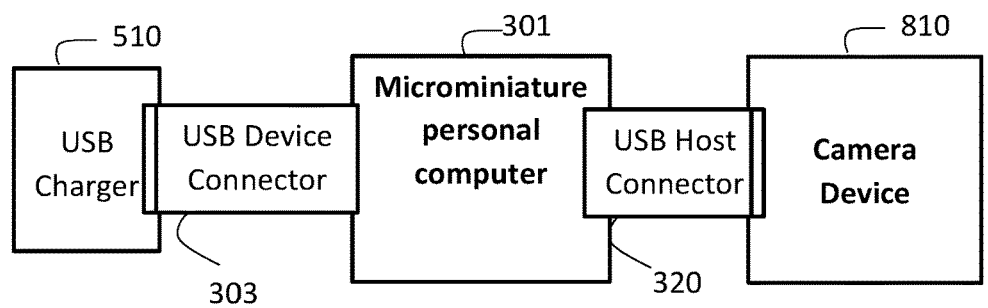

FIG. 5D shows an illustrative interaction between the microminiature personal computer 301 and a camera device 810 via a USB Host connector 320. After the microminiature personal computer 301 get power from the USB charger 510 via a USB Device connector 303, it starts the Operating System. A service of the Operating System recognizes the camera device 810 and copy images and videos from the camera device into non-volatile memory until the device would be disconnected. If available non-volatile memory is limited, the service connects to the Internet via the network module and save data into a pre-set cloud location.

The external computing device has access to areas with the drives and the programs needed to be installed on the external computing device but is not given access to other areas of memory of the microminiature personal computer 31. Access to such other areas of memory is disabled on the hardware level, operation system level, or both, in any conventional manner.

While the foregoing description and drawings represent the preferred embodiments of the present invention, it will be understood that various changes and modifications may be made without departing from the scope of the present invention.

What is claimed is:

1. A portable apparatus, comprising:
a microminiature personal computer having an interconnected processor, a random access memory (RAM), a non-volatile memory, a security module, a network module, a universal serial bus (USB) connector, an operating system, programs, drivers, and user applications;
the microminiature personal computer being configured and arranged to connect to an external computing device via the USB connector;
the external computing device having a user interface that receives output from the programs, which all execute in full isolation from the external computing device;
a windowing system configured and arranged to handle all communication between the external computing device and the microminiature personal computer and operative with windows on the external computing device;
the microminiature personal computer only uses the external computing device for information input/output, which is communicated through the windowing system;
the external computing device remains fully functional such that a user may work simultaneously with programs executing on the external computing device and programs executing on the microminiature personal computer;
an encrypted network having a secure data transfer protocol being configured and arranged to provide two-way communication so that the microminiature personal computer and the external computing device are in communication with each other only over the encrypted network connection.

2. The apparatus of claim 1, wherein the microminiature personal computer is configured and arranged to get power from a charger or a battery and to work independently without connection to any external device or with connection to other external devices that are not providing power for carrying out tasks.

3. The apparatus of claim 1, further comprising:
connecting the microminiature personal computer to the external computing device with another connector, the connector being selected from the group consisting of HDMI, IEEE 1394, LPT, Ethernet, Wi-Fi, and Bluetooth enabled.

4. The apparatus of claim 1, further comprising an HDMI connector that is configured and arranged to connect to the external computing device, which is selected from the group consisting of one of a plurality of displays, TV sets and other devices supporting HDMI, the external computing devices being configured and arranged for the information input/output.

5. The apparatus of claim 1, wherein the microminiature computer has a Wi-Fi module, an Ethernet emulation module, and a 2G/3G/4G module and is able to work as a Wi-Fi/Internet bridge.

6. The apparatus of claim 1, wherein programs executing on the external computing device and programs executing on the microminiature personal computer are represented by different windows on a monitor of the external computing device.

7. A method of communication between a microminiature personal computer and an external computing device, comprising the steps of:

attaching the microminiature personal computer to an external computer device via a universal serial bus (USB) connector;
getting power through the USB connector and starting the operating system of the microminiature personal computer;
an external computing device having a user interface receiving output from programs executing on the microminiature personal computer, which are all executing in full isolation from the external computing device;
wherein the windowing system handling all communication between the external computing device and the microminiature personal computer and operating with windows on the external computing device;
the microminiature personal computer only uses the external computing device for information input/output, which is communicated through the windowing system;
the external computing device remains fully functional such that a user may work simultaneously with programs executing on the external computing device and programs executing on the microminiature personal computer;
an encrypted network having a secure data transfer protocol and providing two-way communication so that the microminiature personal computer and the external computing device are in communication with each other only over the encrypted network connection.

8. The method of claim 7, further comprising a further connector configured to provide power and, if the further connector is unable provide the power, means for getting the power from a charger or a battery.

9. A microminiature computer, comprising:
a memory storing an operating system, a windowing system, and one or more applications;
a connector configured to connect to an external computing device;
a processor executing the operating system, the windowing system, and the one or more applications in full isolation from the external computing device;
the microminiature personal computer uses the external computing device for information input/output for the applications executing on the processor, which are represented by one or more windows on a monitor of the external computing device using the windowing system;
the external computing device remains fully functional such that a user works simultaneously with programs executing on the external computing device and programs executing on the microminiature personal computer.

10. The microminiature computer of claim 9, wherein:
the connector comprises a USB connector;
the microminiature computer is configured to get power from the external computing device through the USB connector;
communication of information input/output between the microminiature computer and external computing device is encrypted.

11. The microminiature computer of claim 9, wherein the connector comprises an HDMI connector configured to connect to a television for information input/output.

12. The microminiature computer of claim 9, further comprising a wireless module such that the external computing device connects to the wireless module of the microminiature computer for information input/output.

13. The microminiature computer of claim 9, wherein the external computing device does not have access to the memory, other than to an isolated part of the memory storing drivers for the external computing device that allow it to connect to the microminiature computer for information input/output.

14. A computing system comprising:
- an external computing device having a monitor, keyboard, and mouse;
- the microminiature computer of claim 9 connected to the external computing device for information input/output;
- the keyboard and mouse receiving user input for applications executing on the processor of the microminiature computer.

15. The microminiature computer of claim 9, wherein the windowing system comprises an X Windows System.

16. The microminiature computer of claim 9, wherein the microminiature computer is logically attached to the external computing device as a removable storage drive.

\* \* \* \* \*